United States Patent [19]
Sassa

[11] 3,894,191
[45] July 8, 1975

[54] SCANNER EMPLOYING SEQUENTIALLY ACCESSIBLE MEMORY

[75] Inventor: Dennis Joseph Sassa, Englishtown, N.J.

[73] Assignee: Bell Telephone Laboratories, Incorporated, Murray Hill, N.J.

[22] Filed: Aug. 21, 1974

[21] Appl. No.: 499,122

[52] U.S. Cl. .......................... 179/18 FG; 179/27 FF
[51] Int. Cl.$^2$ .......................... H04M 3/22
[58] Field of Search ......... 179/18 FF, 18 FG, 27 FF

[56] References Cited

UNITED STATES PATENTS

| | | | |
|---|---|---|---|
| 3,632,889 | 1/1972 | Sikorsky et al. | 179/27 FF |
| 3,838,225 | 9/1974 | Limberg et al. | 179/27 FF |

*Primary Examiner*—Thomas W. Brown
*Attorney, Agent, or Firm*—D. E. Nester; J. W. Falk

[57] ABSTRACT

An autonomous scanner is disclosed for sequentially scanning a plurality of scan points to detect changes in state and to ascertain the new functional status indicated by any change of state. A plurality of shift registers form a memory to store status and timing information for the scan points in the same sequence in which the scan points are scanned. The number of stages in each shift register is equal to the number of scan points, and corresponding stages in each shift register store information associated with the same scan point. When a particular scan point is interrogated, the present state of the scan point is applied to logic and, concurrently, each of the shift registers is controlled to shift, so that all stored functional status and timing information concerning the scan point are also applied to the logic. The logic then ascertains whether a change of state has occurred and determines the new functional status, if any, associated with the change. New functional status and timing information are then stored in the shift registers to update and maintain the ordered sequence of scan point information.

1 Claim, 7 Drawing Figures

SCANNER EMPLOYING SEQUENTIALLY ACCESSIBLE MEMORY

FIELD OF THE INVENTION

This invention pertains to equipment for scanning a plurality of scan points and more particularly to peripheral scanners utilized in a communication system to ascertain the states of a plurality of communication paths. Even more particularly, this invention pertains to scanners utilized to ascertain the states and line statuses associated with a plurality of telephone lines and/or operator's positions.

BACKGROUND OF THE INVENTION AND PRIOR ART

The scanning of a plurality of scan points to detect changes of state is a continuous routine task. Such a task is well suited to electronic data processing equipment because of its repetitiveness and relative simplicity. Because scanning is so time consuming in terms of processor real-time, small peripheral scanners have been developed to autonomously perform the scanning functions which were previously performed by larger central data processing equipment. This allows the central processing equipment to devote more of its real-time to the complex and more important tasks and thereby increases the capacity of the data processing system.

In one prior arrangement, a scanner reported to the central processing unit only those scan points whose states had changed. In this arrangement, an auxiliary memory was provided to store the previous state of each of the scan points and comparisons were instituted between the stored previous state and the present state to ascertain any changes of state. This was highly effective, but the main processing unit still had to determine the meaning of the change of state.

In a further prior development, the time at which the change of state occurred was recorded for use in ascertaining the meaning of the change of state. This arrangement was useful but the central processing unit had to perform a time-consuming subtraction of two timing entries to ascertain the meaning of the change of state.

It is an object of this invenetion to efficiently scan a plurality of scan points to derive and update status and timing information associated with the scan points in order to minimize the work of the central processing unit.

It is a further object of this invention to efficiently store, retrieve, and update information concerning each scan point in a time-division manner.

It is a still further object of this invention to perform all pulse timing and pulse counting in the scanner thereby further reducing the work load of the main processing unit.

SUMMARY OF THE INVENTION

In accordance with the principles of my invention, a plurality of shift registers are provided in my scanner to store timing and functional status information associated with the scan points. The information in each shift register is arranged in the same sequence in which the scan points are interrogated so that when a particular scan point is interrogated all the shift registers are shifted the same number of stages to output all stored information for that particular scan point. Thus the shift registers form a sequentially accessible memory.

Logic is responsive to the output stored information from the shift registers, as well as the present state of the scan point, for detecting changes of stage and also ascertaining the meaning of any change of state. New timing and functional status information is output from the logic and is inserted in the shift registers for use when that scan point is again interrogated. This new information is inserted in a manner to maintain the ordered sequence of scan point information in the shift registers.

More specifically, the number of stages in each shift register is equal to or greater than the number of scan points and a corresponding stage in each shift register stores information associated with one scan point. For example, the last stage in each of the shift registers may store information associated with scan point $x$ and the next to last stage in each shift register may store information for scan point $x+1$. The scan points are interrogated in a predetermined sequence ($x$, $x+1$. . . $n$, $x$, $x+1$. . .) and information concerning the scan points is stored in the registers in a similar sequence ($x$, $x+1$. . . $n$ proceeding from the last stage to the first stage) so that for each succeeding scan point the information in each shift register is only shifted one stage. For example, when scan point $x$ is interrogated, the status and timing information associated with this scan point will be output from the last stage of each shift register. The logic then derives new timing and status information for the scan point. The new information is inserted in the first stage of each of the shift registers and the information in each stage is shifted into the successive stage. Thus, the information for scan point $x+1$ is now in the last stage of each register. Since scan point $x+1$ will be in the next scan point to be interrogated, all information for this scan point will be easily accessible. When scan point $x$ is again interrogated, the information associated therewith will have been shifted $z$-1 times (where $z$ is equal to the number of shift register stages or potential scan points) and will again be in the last stage of each shift register.

This one illustrative embodiment of my invention pertains to scanning trunks utilized in the provision of telephone service and to scanning positions utilized by operators to service special toll calls (person to person, collect, credit card, bill-to-third number, coin, etc.). The present stage information for the scan points indicates whether a position has a service request, or whether a trunk is in an off-hook condition or in an on-hook condition. For a trunk, a change of state may indicate a new functional line status such as (1) line seizure (2) start of a dial pulse (3) end of a dial pulse (4) disconnect, and (5) end of a digit. The scanner is adapted to report only significant changes of state and the new functional status associated therewith in order to minimize the work load of the main processing unit. For example, the scanner is adapted to count the number of pulses in each group of call signals (such as a dial digit) and to provide a report of each call signal group including the number of pulses at the termination of the call signal group. However, the scanner will not report less important changes to the main processing unit such as the detection of a new dial pulse.

More specifically, the sequentially accessible memory includes four groups of shift registers. The first group stores the state of the scan points at the last look, as well as the state of the scan points at the scan preceding the "last look" scan which is hereinafter designated the state-before-last-look state. The second group of shift registers stores logical state information which is needed to derive the present functional status of a line such as interdigit timing, pulse continuing, end of a digit, etc. The third group of shift registers stores pulse timing information utilized in ascertaining the meaning of a change of state. For example, the timing information is utilized to ascertain whether a particular scan point is indicating a dial pulse or a disconnect. The fourth group of shift registers stores information specifying the number of dial pulses received for each call signal group (e.g., dial digit).

To reiterate, timing and status information for each scan point is stored in corresponding stages of each of the shift registers. This information is shifted in the registers as the scan points are successively interrogated so that when a particular scan point is interrogated all stored timing and status information for that scan point is output. This enables the scanner to autonomously perform change of state as well as functional line status detection on a time-division basis.

In accordance with a feature of my invention, a plurality of shift registers are provided to store timing and status information for the scan points in the same sequence in which the scan points are interrogated.

In accordance with another feature of my invention, operator positions and communication lines can be scanned by the same scanner.

In accordance with still another feature of my invention, an autonomous scanner performs all routine tasks associated with the derivation of call signals received over communication lines and reports only major changes in the functional status of such lines.

BRIEF DESCRIPTION OF THE DRAWING

The foregoing, as well as other objects, features, and advantages of my invention, will be more apparent from a description of the drawing in which FIGS. 1 through 3, when arranged as shown in FIG. 4, illustrate the structure of an illustrative embodiment of my invention. More specifically.

FIG. 4 illustrates the manner in which FIGS. 1–3 are to be arranged;

GENERAL DESCRIPTION

Figure 1:
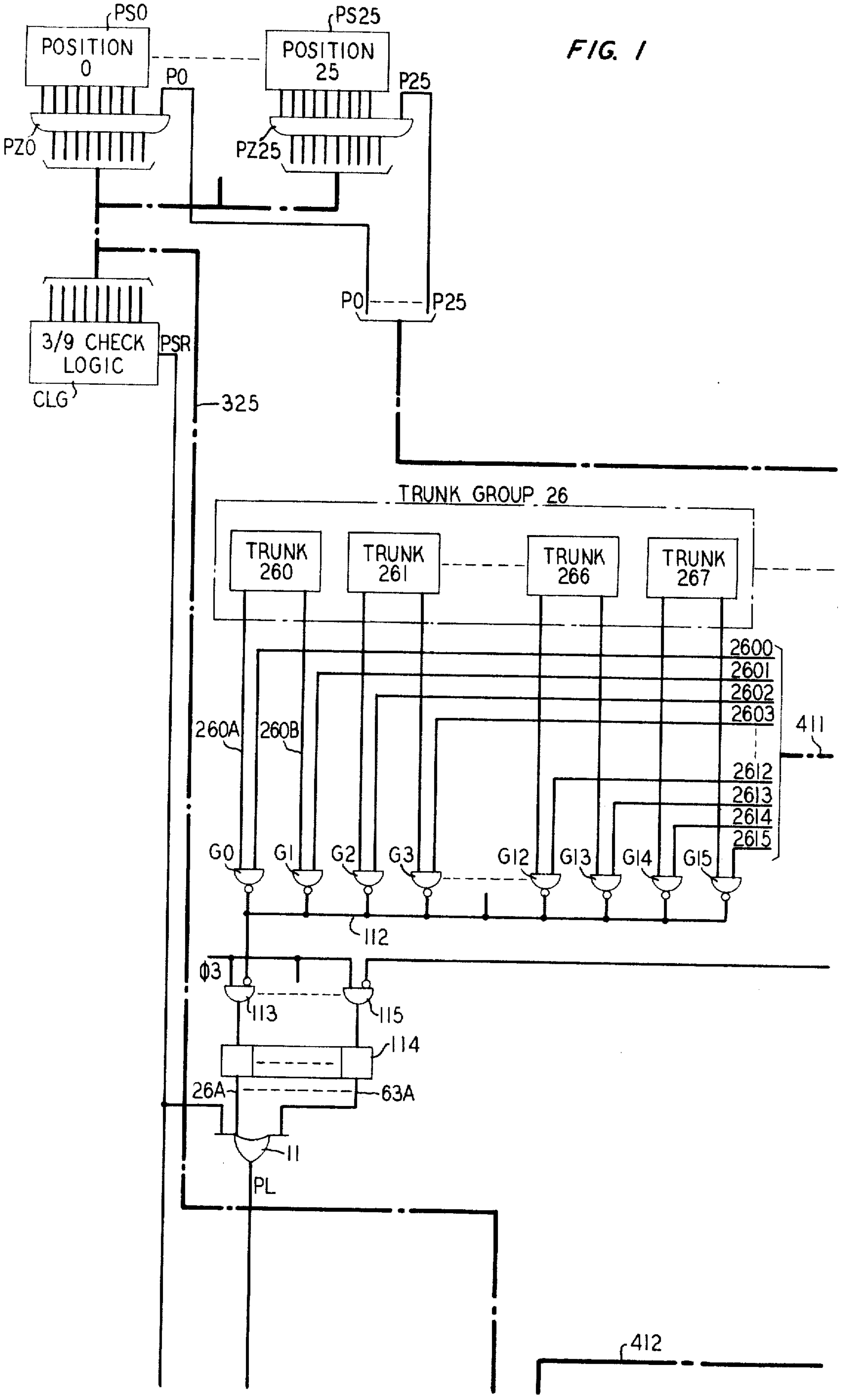
FIG. 1 illustrates some of the scanning logic associated with operator positions and trunk groups.
Figure 4:
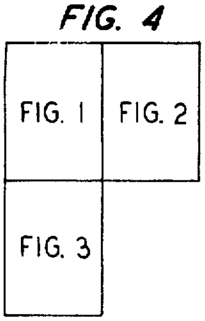
Figure 2:
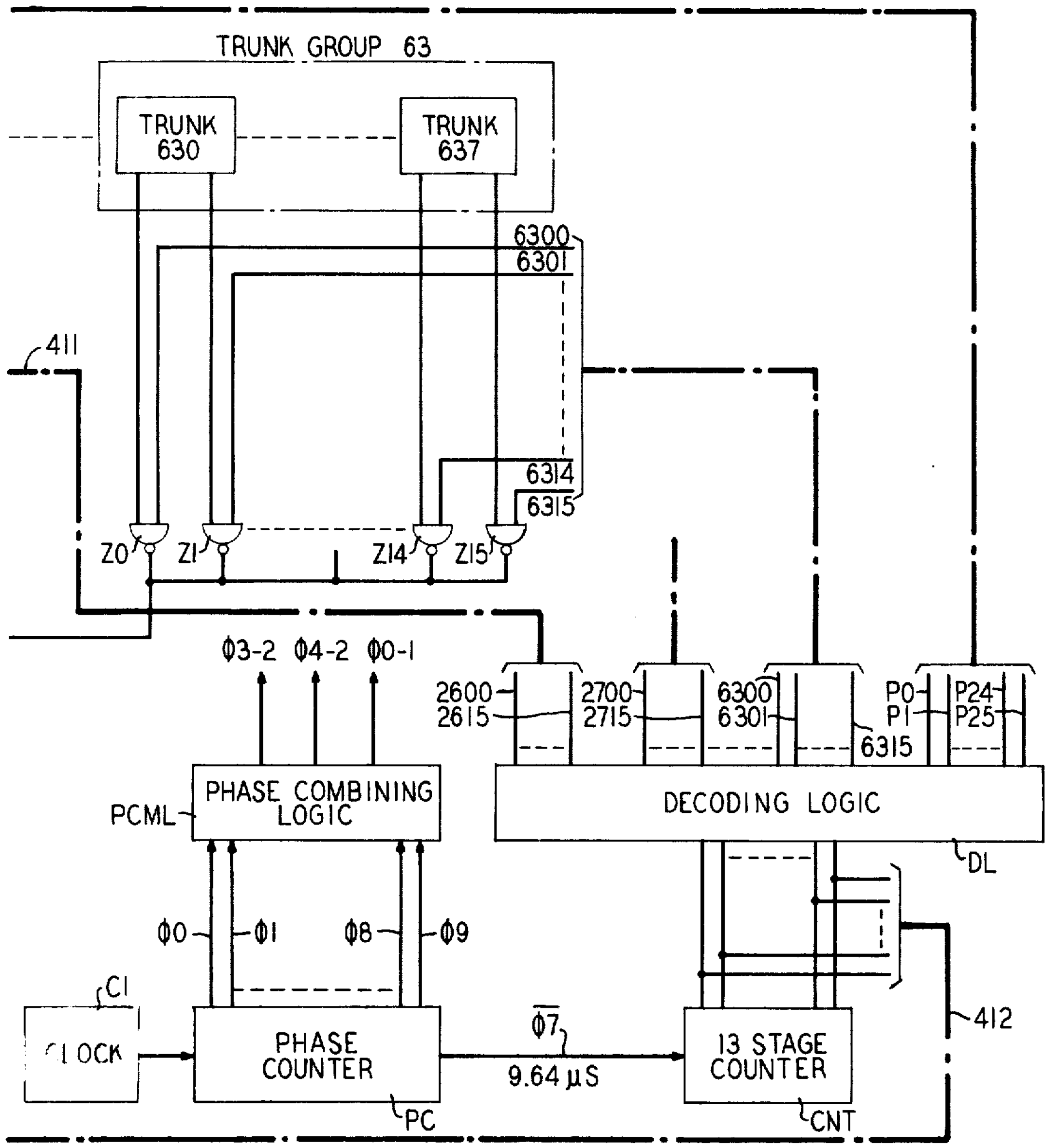
FIG. 2 illustrates similar logic associated with other trunk groups, and also illustrates timing and decoding apparatus for sequentially interrogating the scan points.
Figure 3:
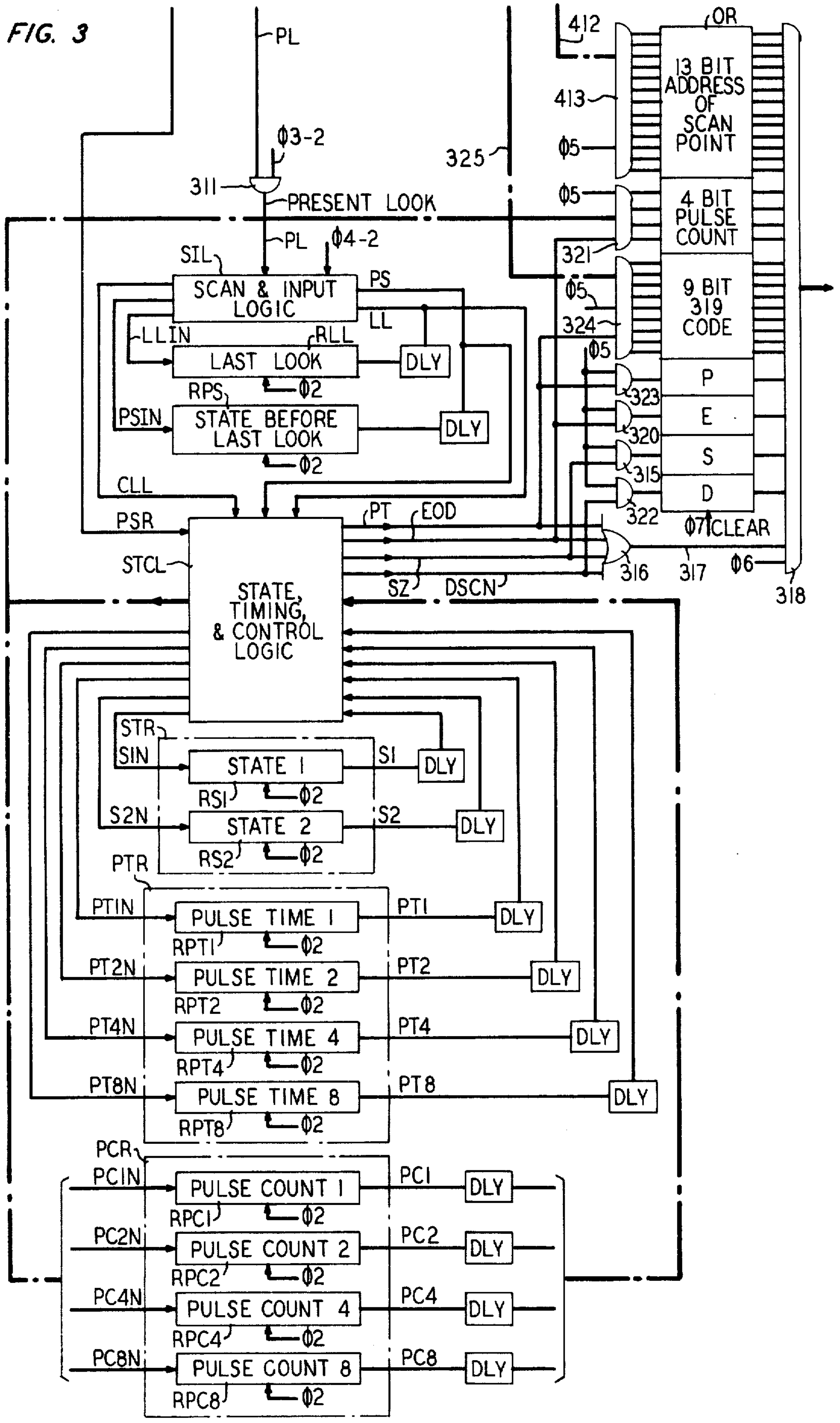
FIG. 3 illustrates the four groups of shift registers and the scan, state, timing and control logic associated therewith.

FIGS. 1 through 3, when arranged as shown in FIG. 4, illustrate one illustrative embodiment of my scanner and the various operator positions and trunk groups associated therewith. The operator positions PSO-PS25 are well-known operator positions and may be of the type shown in R. J. Jaeger, Jr., et al. U.S. Pat. No. 3,484,560, issued Dec. 16, 1969. The Jaeger patent concerns telephone equipment known as TSPS for serving customer dial calls including those requiring operator assistance.

The various trunks shown in FIGS. 1 and 2, for example, TRK 260-TRK 267 and TRK 630-TRK 637, are well-known dial pulse trunks utilized in TSPS arrangements and are situated between a local switching office and a toll switching office. Eight trunks are provided in each trunk group and 27 trunk groups are provided. Each trunk has two scan points, one associated with the status of the communication line extending to the local office and the other associated with the status of the communication line extending to the toll office. More specifically, each trunk can be "split" so that an operator can speak to either the calling party through the local office or to the called party through the toll office. The trunks may be of the type for example shown in FIG. 92 of the above-mentioned Jaeger patent with the inclusion of well-known pulse shape correcting logic.

FIG. 2 generally illustrates timing logic for sequentially interrogating each of the scan points. Each position is served by a single scan point and, as described previously, each trunk is served by two scan points. Clock Cl in FIG. 2 drives phase counter PC which, in turn, drives 13-stage binary address counter CNT. Decoding logic DL is responsive to the present state of the counter CNT for providing an output interrogate signal on one of its output leads, such as PO-P25, 2,600–2,615, . . . , or 6,300–6,315. As the count in counter CNT changes, decoding logic DL provides output signals on its output leads in sequence to sequentially interrogate the scan points, as hereinafter described. The decoding logic is able to provide a signal on any of 1,280 unique output leads. However, in this embodiment of my invention, only about half this number of output leads is provided corresponding to the actual number of scan points in this embodiment. Additional scan points may be added if, as described hereinafter, at a later time a trunk group is substituted for a position or other equipment is added. The scanner can be easily reconfigured if it becomes necessary to increase or decrease the respective number of positions and trunk groups.

Decoding logic DL in FIG. 2 provides an interrogate signal which strobes one of the scan gates, such as GO-G15, or ZO-Z15. The output of the interrogated gate then provides an indication of the present state of the interrogated scan point. Each scan gate is uniquely associated with a scan point and monitors the present state of the associated scan point. At the proper time, as explained hereinafter, this present state indication is applied to OR gate 11 in FIG. 1 which provides the present look indication to scan and input logic SIL in FIG. 3. This logic is responsive to (1) the present look indication (i.e., present state) (2) the state of the scan point the last time it was interrogated (i.e., last look), and (3) the "state before last look" state of the scan point which indicates the state of the scan point at two interrogations preceding the instant interrogation. Logic SIL indicates a change of state over lead CLL only after two consecutive scans have verified that, in fact, the state of the scan point has changed. This verification avoids reporting false changes of state due to noise or other temporary spurious line conditions.

Shift registers RLL and RPS in FIG. 3 each contain 1280 stages corresponding to the potential 1280 scan point capacity of the scanner. Since less than 1280 scan points are used in this embodiment, the stages in the shift registers corresponding to these unused scan points are not utilized to store any useful information.

When the present look information for an interrogated scan point is applied to logic SIL as described above, registers RLL and RPS concurrently output the last look and the state-before-last-look state of the interrogated scan point to logic SIL over leads LL and PS respectively—in the form of a binary bit, i.e., either a one or a zero. Delay elements DLY provide a 500 ns delay to avoid a race condition as hereinafter described. Logic SIL generates an output over lead LLIN to store new last look information in register RLL. This new last look information is equal to the state of the scan point at the present look. Thus, LLIN = PL $\phi$4-2, where $\phi$4-2 indicates a timing interval to be described hereinafter. Thus, if PL is equal to one, then LLIN is equal to one so that on the next scan of the scan point (after each of the other scan points has been interrogated), LL will be equal to one to indicate that the last time the scan point was interrogated it was in a one state. LLIN becomes LL for the next scan of the scan point because the bit inserted in register RLL over lead LLIN is shifted into a successive stage of register RLL each time another scan point is scanned. Finally when the instant scan point is again interrogated the bit will be in the last stage of register RLL.

Logic SIL also provides an output over lead PSIN to update the information in register RPS in accordance with the formula PSIN = LL $\phi$4-2. Thus, PSIN is equal to the last look information (i.e., LL) for the scan point and indicates the state of the scan point at two scans before the instant scan. Specific examples will be discussed hereinafter to explain in greater detail the use of last look and state-before-last-look information.

Logic SIL provides a third output, known as a corrected last look, over lead CLL which indicates verified changes of state. Thus, as described hereinafter, when the state of lead CLL changes, this indicates a verified change of state for a particular scan point. More specifically, CLL = PL LL + LL PS + PL PS. Thus, when a scan point first changes state, PL might be equal to one and LL might be equal to zero. CLL would then be zero. However, on the subsequent scan, PL would again be a one, whereas LL would now be a one also because LLIN is equal to PL at the last scan (i.e., one) and LLIN becomes LL after register RLL is shifted 1279 times. Thus CLL is equal to one and the transition of CLL from zero to one would indicate a verified change of state.

State, timing, and control logic STCL in FIG. 3 is responsive to the CLL lead from logic SIL and is also responsive to information output from the remaining shift registers. Each of these other registers is structurally similar to registers RLL and RPS and each have 1280 stages. More specifically, registers RS1 and RS2 store state information which partially indicates the particular functional status of a line, such as interdigit timing, end of dial pulse, etc. Logic STCL is also responsive to the information in registers RPT1, RPT2, RPT4, and RPT8. This group of registers in combination stores pulse timing information. This information is utilized to indicate whether a pulse represents a dial pulse or a disconnect. More specifically, the registers in combination store a 4-bit binary word associated with each scan point, with RPT1 storing the least significant bit and register RPT8 storing the most significant bit. Thus, if 1010 is stored in the last stage of registers RPT8, RPT4, RPT2, and RPT1 respectively, the registers store a binary ten representing a time associated with one scan point. Hereinafter these registers sometimes will be referred to as pulse timing registers (PTR), and their output leads PT1, PT2, PT4, and PT8 referred to collectively as PT. Moreover, for example, the equation PT = 1001 will be a shorthand notation for PT8 = 1, PT4 = 0, PT2 = 0 and PT1 = 1.

Finally, logic STCL is responsive to information output over leads PC1, PC2, PC4, and PC8 from registers RPC1, RPC2, RPC4, and RPC8, respectively. These registers in combination store a 4-bit binary word for each scan point which indicates the number of dial pulses received in a dial digit. Register RPC1 stores the least significant bit and register RPC8 stores the most significant bit. Thus if 0011 is stored in the last stage of register RPC8, RPC4, RPC2, and RPC1 respectively, a pulse count of three is stored indicating that three pulses have been received by the scan point associated with the information in the last stage. These registers will sometimes be referred to as pulse count registers (PCR) and a shorthand notation for their outputs (PC) similar to that explained above for PT will be used. Thus PC = 0011 indicates that PC8 = 0, PC4 = 0, PC2 = 1, and PC1 = 1.

Logic STCL is jointly responsive to information input thereto over leads CLL, S1, S2, PT1, PT2, PT4, PT8, PC1, PC2, PC4, and PC8. In response to this information, logic STCL generates new timing and status information for each of the scan points, which information is input into the state, pulse time, and pulse count registers over leads S1N, S2N, PT1N, PT2N, PT4N, PT8N, PC1N, PC2N, PC4N and PC8N. It should be noted that each of these input leads is designated by a symbol ending with an N, whereas most of the corresponding output lead designations are identical except for the lack of this N.

Logic STCL also provides other output indications for reporting significant changes of state. More specifically, when logic STCL ascertains that a line has been seized for use (i.e., station has gone off-hook to institute a service request), it provides an output signal over lead SZ. A similar signal is provided over lead DSCN when a disconnect is detected and a similar signal is provided over lead EOD when an end of digit is detected. Control logic STCL is also responsive to service requests from operator positions PSO-PS25 for generating an output signal over a lead PT, as described hereinafter.

Register OR in FIG. 3 is provided for temporarily storing reports for the central processor which indicate significant changes of state. This register has storage for 30 bits; however, only certain bits store useful information for a report depending upon the type of report, as described hereinafter. A one is inserted in the first bit position (D) when a disconnect is detected, and similarly a one is inserted in the second, third, or fourth position for seizures, end of digits, and position service requests, respectively. The next group of 9 bits stores a three-out-of-nine code which is generated by an operator's position when the operator depresses a key thereon to indicate a particular service request. When an end of digit signal is generated over lead EOD, the present pulse count (PCN) input to the four pulse count shift registers (PCR) is gated into the next 4-bit positions of register OR to specify the number od dial pulses received in the digit. The remaining 13 bits in the register are used to store the address of the specific scan point being interrogated for which the report was generated. This address is identical to the present count in counter CNT.

To generalize the preceding description, decoding logic DL generates an output signal on a unique interrogate lead to strobe a scan gate so that the present state (i.e., present look) of the scan point associated therewith is applied to scan and input logic SIL. Concurrently, the last bit in each of the shift registers (which bits are associated with this scan point) is output to logic SIL or STCL. In response to the last look (LL) and state-before-last-look (PS) information for the scan point, logic SIL generates a signal over lead CLL. Logic STCL is responsive to this signal over lead CLL in conjunction with the information from the state, pulse time, and pulse count shift registers for ascertaining whether a significant change of state has occurred. If a significant change of state has occurred, logic STCL applies a HIGH signal over the appropriate lead associated with register OR to generate a report which indicates the change and the appropriate information associated therewith. Logic STCL also generates new state, new pulse time, and new pulse count information which is respectively inserted in the first stage of each of the state, pulse time, and pulse count shift registers. Logic SIL also generates new last look and state-before-last-look information which is inserted in the first stage of registers RLL and RPS respectively. When that particular scan point is again interrogated (i.e., 1,279 scans later), the information inserted in the first stage of each of the shift registers will have been shifted 1279 times to the last stage of each of the shift registers and will then be applied to logic STCL or logic SIL in an identical manner.

When an operator's position is interrogated, the information in the state, pulse time, and pulse count shift registers is not needed. Therefore, this information is ignored by logic STCL whenever lead PSR is HIGH, indicating the scanned position request service, as hereinafter described. However, the last look and state-before-last-look information stored in registers RLL and RPS, respectively, are utilized for the positions in the same manner in which they are utilized for the trunk scan points.

Thus, in accordance with this embodiment of my invention, an autonomous scanner operates in a time-division manner to ascertain the present state and status of a plurality of scan points and to report only significant changes of state. This is accomplished by storing state, timing, and count information in a plurality of shift registers in the same sequence in which the scan points are interrogated. By inputting new information into the shift registers, the stored information can be efficiently updated while maintaining the ordered sequence of information. Moreover, since the same logic is utilized to scan positions as well as trunk groups; if the need arises, positions can be easily substituted for trunk groups, or vice versa.

Specific Description

The operation of the scanner disclosed in FIGS. 1–3 will be hereinafter described in detail in accordance with the specific example shown in FIG. 7. However, prior to considering this example, the timing of the system will be explained and also the Boolean equations and state diagram for logic STCL will be explained.

Figure 6:
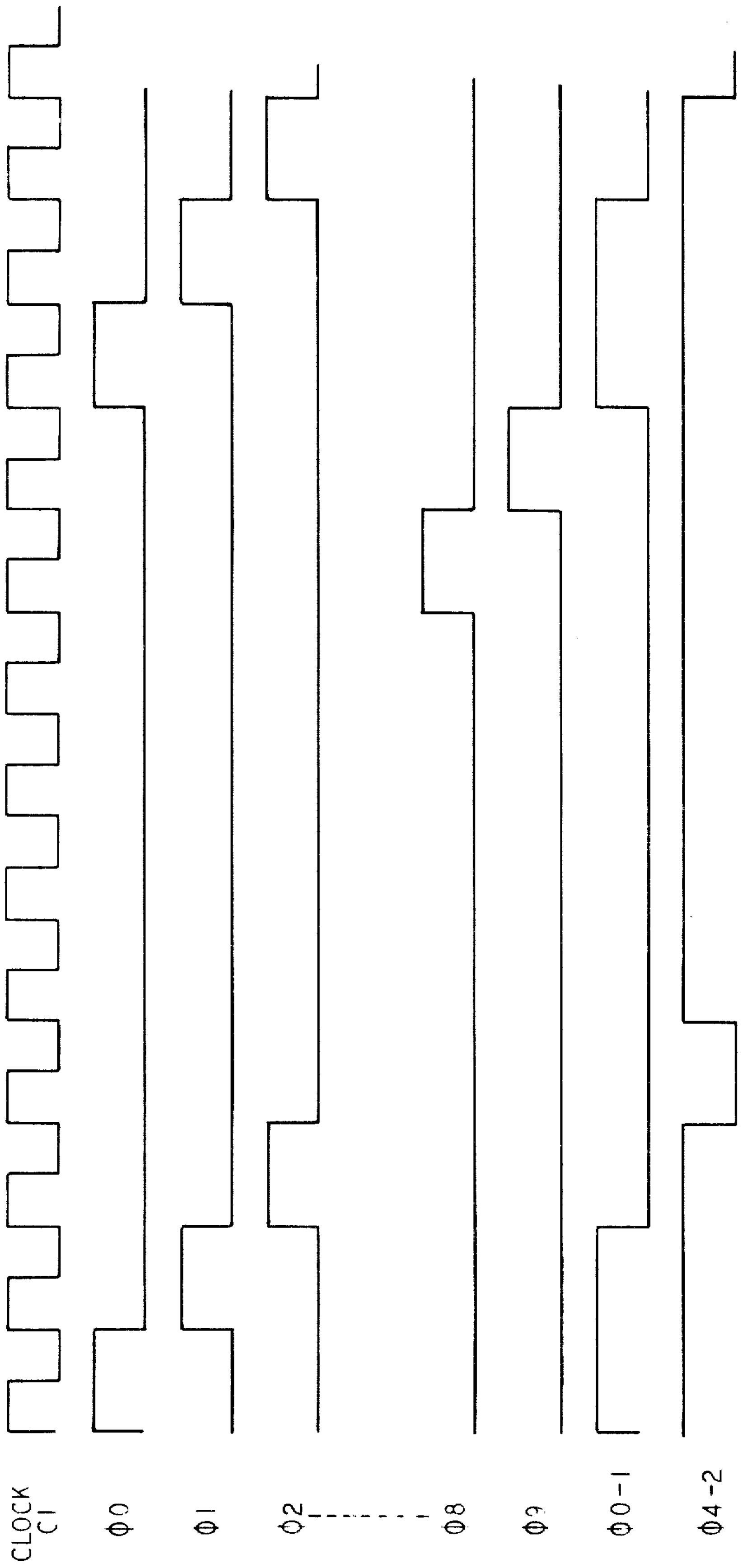
FIG. 6 illustrates the timing signals provided by clock Cl in FIG. 2 and also the various clock phases utilized to selectively control the gating of information in this embodiment.
Figure 7:
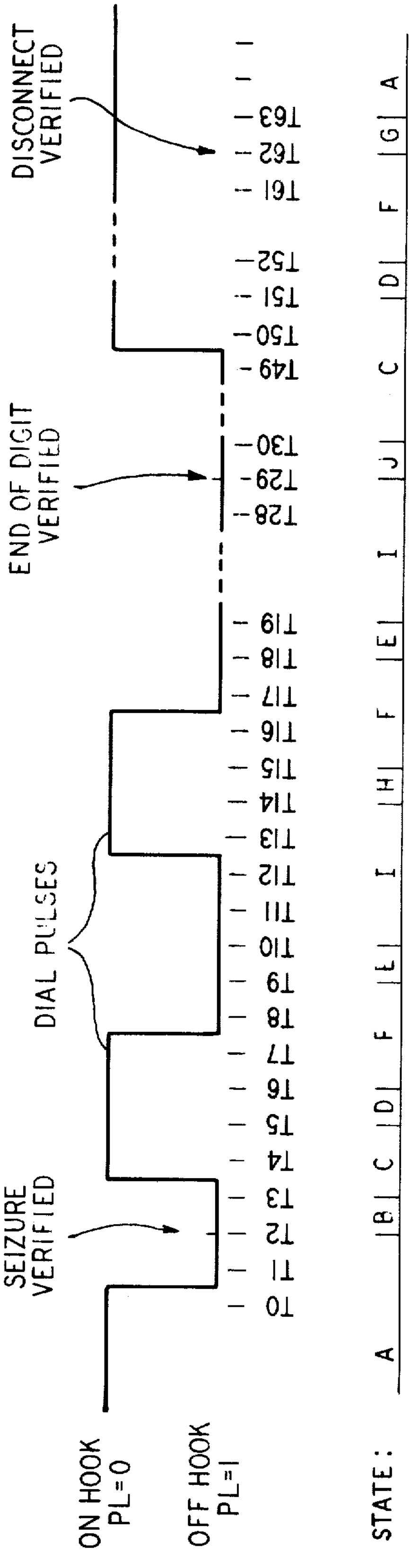
FIG. 7 illustrates a typical call received over one of the trunks and the various states assumed by logic STCL in detecting and reporting the functional status of the call.

Turning now to FIG. 7, the source of timing signals in the system is clock CL which generates a 1.0368 MHZ square wave of the shape shown in the upper line of FIG. 6. This square wave is applied to phase counter PC which serves to continuously delineate time into cycles. More specifically counter PC continuously counts from zero to nine incrementing the count at each positive transition of clock Cl, and thereby delineates a cycle comprising 10 clock pulses into 10 phases enumerated $\phi 0$ - $\phi 9$. These waveforms are shown in FIG. 7. Phase-combining logic PCML ORs together various of these phases to provide timing pulses of longer duration. For example as illustrated in FIG. 7, $\phi 0$ - 1 is a waveform derived by ORing together $\phi 0$ and 1. Similarly $\phi 4$ -2 is a waveform which begins at $\phi 4$ and terminates at the negative transition of $\phi 2$ at the following cycle. As described hereinafter, these phase signals serve to gate information between various elements of the system at designated time intervals. Counter CNT comprises 13 counting stages for counting from 0 to 1279. The counter increases its present count on each negative transition of $\phi 7$ ($\phi 7$ is the complement of $\phi 7$) and therefore increments its count approximately every 9.64 μs. Decoding logic DL is responsive to the states of the 13 stages of counter CNT for decoding the count to provide an output on one of the leads PO-P24, 2600-2615 . . . 6,300–6,315. Thus each time the count changes, logic DL generates an output on a different lead. In this embodiment, logic DL generates output signals on leads 2,600–2,615 . . . 6,300–6,315 and PO-P25 in sequence so that the scan points are interrogated in sequence (i.e., first gate 60 is interrogated, and then gate 61 is interrogated . . . etc.). Moreover because not all output leads are utilized in this embodiment, for many counts logic DL does not interrogate a gate. However, it should be realized that these unused counts could be utilized to interrogate other scan points such as those associated with alarms, as well as other equipment.

By way of example we will assume that decoding logic DL enables lead 2600 when counter CNT assumes a count of all Os. This lead extends via cable 411 to trunk group 26 in FIG. 1, and more specifically to gate GO. We will assume that the scan point associated with gate GO in trunk 260 is HIGH and provides a HIGH input to gate GO over lead 260A. In the following description, the term HIGH will be used synonymously with a binary 1 and will indicate an off-hook state for a trunk, and a LOW state will be synonymous with a binary 0 and will indicate an on-hook state for a trunk. Moreover, the leads extending to scan points will often be called scan points themselves, since these leads are the points which are scanned.

Since both inputs to NAND gate GO are HIGH, the gate provides a LOW output signal which pulls down the HIGH outputs of each of the other gates GI-GI5. The LOW signal on lead 112 is inverted at the input of gate 113 and during $\phi 3$ gate 113 is enabled and outputs a 1 into the first bit position of register 114. Register 114 comprises 38 stages respectively associated with trunk groups 26–63. Also at $\phi3$ the other trunk groups provide inputs to corresponding stages of register 114. For example, in regard to trunk group 63, each of the NAND gates ZO-Z15 provide HIGH output signals which signals are inverted at the input of gate 115, in As is well known to logical designers, a state diagram may be implemented in the form of tables and binary equations. Table I below illustrates the various states corresponding to those shown in FIG. 6, the various inputs under which state transformations will be made, and also the response in each of the states.

Table I

| State | Mode | Input | Meaning | Response |
|---|---|---|---|---|
| A | Standby<br>(S2=0 S1=0) | PT=1010<br>CLL=0 | Idle line | None |
| B | " | PT=1010<br>CLL=1 | Seizure | Report seizure<br>Set PTN=0000 |
| C | " | PT=0000<br>CLL=1 | Stable call | None |
| D | " | PT=0000<br>CLL=0 | Start of pulse or disconnect | Set PCN=0000<br>Set S1N=1 |
| E | Pulse & Disconnect Timing<br>(S2=0 S1=1) | CLL=1 | End of dial pulse | PCN=PC+1<br>Set PTN=0000<br>Set S1N=S2N=1 |
| F | " | CLL=0<br>PT<1010 | Pulse or disconnect continuing | PTN=PT+1 |
| G | " | CLL=0<br>PT=1010 | Disconnect | Report disconnect<br>Set S1N=S2N=0 |
| H | Interdigit Timing<br>(S2=1 S1=1) | CLL=0 | New dial pulse in same digit | Set PTN=0000<br>Set S1N=1<br>S2N=0 |
| I | " | CLL=1<br>PT<1010 | Interdigit timing continuing | PTN=PT+1 |
| J | " | CLL=1<br>PT=1010 | End of digit | Report digit<br>Set PTN=0000<br>Set S1N=S2N=0 |

FIG. 1. Thus at $\phi3$, a 0 is inserted in the last stage of register 114. Similarly each of the other trunk groups except for 26 inserts a 0 in register 114. The 38 stages of register 114 provide a HIGH or LOW output signal over leads 26A-63A respectively reflecting the bits stored therein. Lead 26A is HIGH and leads 27A-63A provide LOW outputs. OR gate 11 responsive to the HIGH signal on lead 26A provides a HIGH signal or 1 over lead PL. This lead conveys the present look for the interrogated scan point (i.e., lead 260A). During time interval $\phi3$-2, gate 311 is enabled to provide the present look information to scan and input logic SIL. The equations defining the outputs of logic SIL were previously specified.

Figure 5:
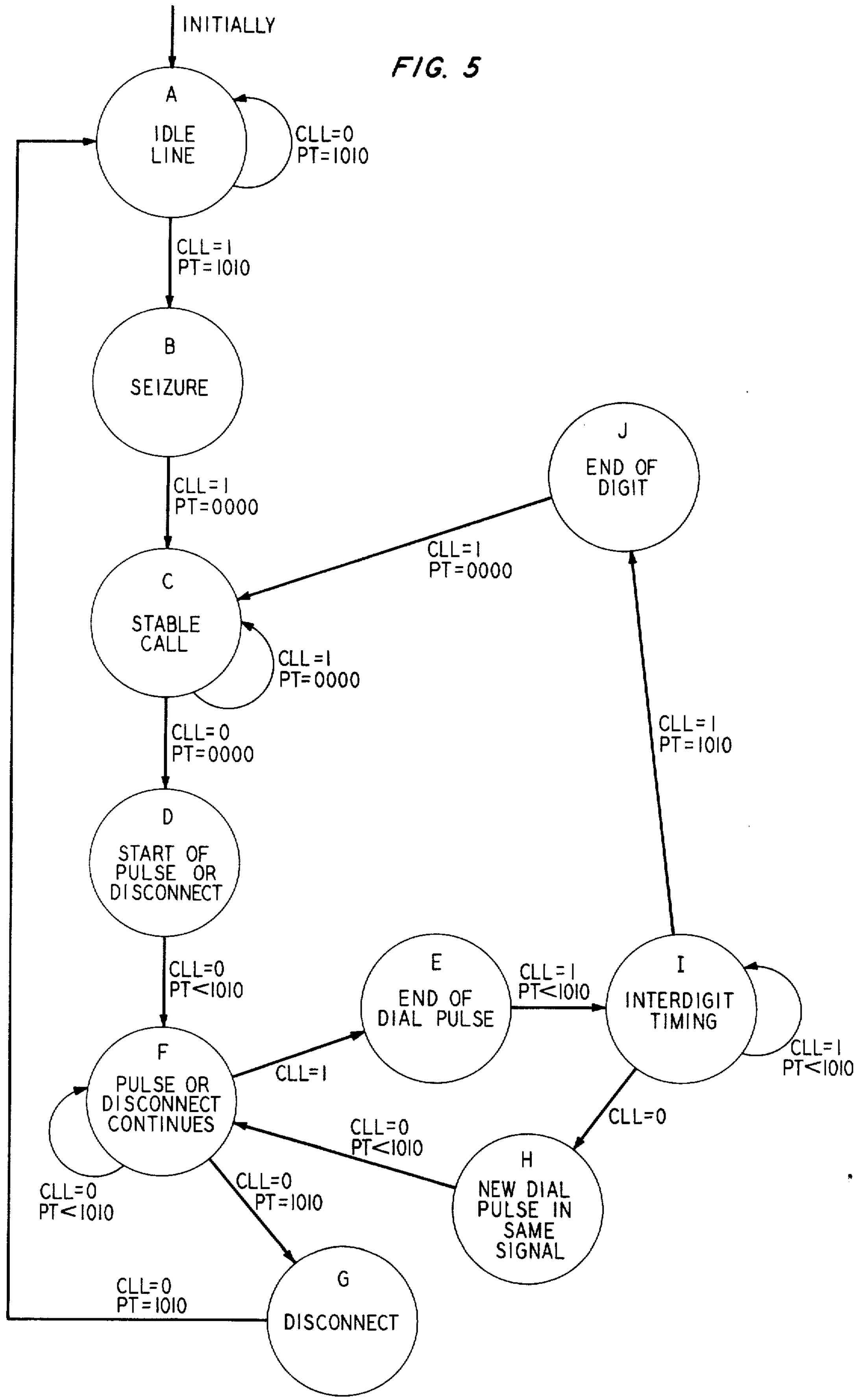
FIG. 5 shows a state diagram implemented by logic STCL in FIG. 3.

The state diagram for logic STCL is illustrated in FIG. 5. Ten states are shown designated state A through state J. Each state has a "line" condition or functional status associated therewith. For example, state A represents an idle line and state B represents a seizure of the line. The meanings of the other states are self-explanatory. This state diagram indicates under what conditions a transformation will be made from one state to another. For example, ititially all calls begin in state A. When CLL is equal to 1 and pulse time is equal to 1010 (which represents binary 10), then the logic goes from state A to state B, as shown in FIG. 5. The equations shown between the states in FIG. 5 represent the specific input conditions under which a state transformation is made. Thus if CLL = 0 and PT = 1010, the logic would have remained in state A. For further discussion concerning state diagrams and logic design therefrom information may be found in F. J. Hill et al.'s book entitled *Introduction to Switching Theory and Logical Design*, published by John Wiley and Sons in 1968. Further detailed information may be found in F. J. Hennie's book, entitled *Finite State Models for Logical Machines*, published by John Wiley and Sons in 1968.

For example, when the logic is in state C representing a stable call, the logic will enter state D, if PT=0000 and CLL=O. This transformation indicates the start of a dial pulse or the beginning of a disconnect. When a call enters state D, PCN is set to equal to 0000 and SIN is set equal to 1. The designation PCN=0000 is a shorthand notation for expressing that PC8N=0; PC4N=0; PC2N=0; and PC1N=0 as mentioned previously. This shorthand notation will be similarly used in expressing PC, PT, and PTN. For example PT=1010 is equivalent to PT8=1, PT4=0, PT2=1 and PT1=0.

The above talbe and state diagram shown in FIG. 6 are also implemented as Boolean equations expressing the logical relationship between the inputs and outputs of logic STCL. These equations are hereinafter utilized in ascertaining the various putput signals generated by logic STCL In regard to the example in FIG. 8. nMore specifically all the Boolean equations are specified below. These equations may be further simplified in accordance with well-known Boolean equivalents; however, they are presented in this format to facilitate an understanding of their meanings vis-a-vis Table I above.

$$S1N = \phi4\text{-}2\ [\overline{PT1}\ \overline{PT2}\ \overline{PT4}\ \overline{PT8}\ \overline{CLL}\ \overline{S1}\ \overline{S2} + \overline{PT8}\ \overline{PT2}\ \overline{S2}\ \overline{S1} + \overline{PT8}\ \overline{PT2}\ S2\ S1] \quad (1)$$

$$S2N = \phi4\text{-}2\ [\overline{S2}\ S1\ CLL\ (PT8\ PT2 + S1\ S2\ CLL\ (\overline{PT8}\ \overline{PT2})\ ] \quad (2)$$

$$PT8N = \phi4\text{-}2\ [\overline{S1}\ \overline{S2}\ PT8\ \overline{PT4}\ PT2\ \overline{PT1}\ \overline{CLL} + S1\ \overline{S2}\ \overline{CLL}\ (\overline{PT8}\ \overline{PT2})\ ]\ [PT8 + PT4\ PT2\ PT1]\ \ S1\ \overline{S2}\ \overline{CLL}\ PT8\ \overline{PT4}\ PT2\ \overline{PT1} + S1\ S2\ CLL\ \overline{PT8}\ \overline{PT2}\ [PT8 + PT4\ PT2\ PT1)\ ] \quad (3)$$

$$PT4N = \phi4\text{-}2\ [S1\ \overline{S2}\ \overline{CLL}\ \overline{PT8}\ \overline{PT2}\ (\overline{PT4}\ PT2\ PT1 + PT4\ \overline{PT2} + PT4\ \overline{PT1}) + S1\ S2\ CLL\ (\overline{PT8}\ \overline{PT2})\ (\overline{PT4}\ PT2\ PT1 + PT4\ \overline{PT2} + PT4\ \overline{PT1})\ ] \quad (4)$$

$$PT2N = \phi4\text{-}2\ [\overline{S1}\ \overline{S2}\ \overline{CLL}\ PT8\ \overline{PT4}\ PT2\ \overline{PT1} + SL\ \overline{S2}\ \overline{CLL}\ (\overline{PT8}\ \overline{PT2})\ [PT2\ (\overline{PT1}) + \overline{PT2}\ PT1]\ \ S1\ \overline{S2}\ \overline{CLL}\ PT8\ \overline{PT4}\ PT2\ \overline{PT1} + S1\ S2\ (\overline{PT8}\ \overline{PT2})\ [PT2\ (\overline{PT1}) + \overline{PT2}\ PT1)\ ] \quad (5)$$

$$PT1N = \phi 4\text{-}2\ [\overline{S2}\ S1\ \overline{CLL}\ (\overline{PT8}\ \overline{PT2})\ \overline{PT1} + S1\ S2\ CLL\ (\overline{PT8}\ PT2)\ \overline{PT1}] \quad (6)$$

$$PC8N = \phi 4\text{-}2\ [\overline{S1}\ \overline{S2}\ CLL\ \overline{PT8}\ \overline{PT4}\ \overline{PT2}\ \overline{PT1}\ \overline{PC8} + \overline{S2}\ S1\ CLL\ [PC8 + PC4\ PC2\ PC1]\ \ \overline{S2}\ S1\ \overline{CLL}\ (\overline{PT8}\ \overline{PT2})\ PC8 + S1\ S2\ \overline{CLL}\ PC8 + S1\ S2\ CLL\ (\overline{PT8}\ \overline{PT2})\ PC8 + S1\ S2\ CLL\ PT8\ \overline{PT4}\ PT2\ \overline{PT1}\ PC8] \quad (7)$$

$$PC4N + \phi 4\text{-}2\ [\overline{S1}\ \overline{S2}\ CLL\ \overline{PT8}\ \overline{PT4}\ \overline{PT2}\ \overline{PT1}\ PC4 + \overline{S2}\ S1\ CLL\ [\overline{PC4}\ PC2\ PC1 + PC4\ \overline{PC2} + PC4\ \overline{PC1}] + \overline{S2}\ S1\ \overline{CLL}\ (\overline{PT8}\ \overline{PT2})\ PC4 + S1\ S2\ CLL\ PC4 + S1\ S2\ CLL\ (PT8\ PT2)\ PC4 + S1\ S2\ CLL\ PT8\ PT4\ PT2\ PT1\ PC4] \quad (8)$$

$$PC2N = \phi 4\text{-}2\ [\overline{S1}\ \overline{S2}\ CLL\ \overline{PT8}\ \overline{PT4}\ \overline{PT2}\ \overline{PT1}\ PC2 + \overline{S2}\ S1\ CLL\ [PC2\ \overline{PC1} + PC1\ \overline{PC2}]\ \ \overline{S2}\ S1\ \overline{CLL}\ (\overline{PT8}\ \overline{PT2})\ PC2 + S1\ S2\ \overline{CLL}\ PC2 + S1\ S2\ CLL\ (\overline{PT8}\ \overline{PT2})\ PC2 + S1\ S2\ CLL\ PT8\ \overline{PT4}\ PT2\ \overline{PC2}]$$

$$PC1N = \phi 4\text{-}2\ [\overline{S1}\ \overline{S2}\ CLL\ \overline{PT8}\ \overline{PT4}\ \overline{PT2}\ \overline{PT1}\ PC1 + \overline{S2}\ S1\ CLL\ \overline{PC1} + \overline{S2}\ S1\ \overline{CLL}\ (\overline{PT8}\ \overline{PT2})\ PC1 + S1\ S2\ \overline{CLL}\ PC1 + S1\ S2\ CLL\ (\overline{PT8}\ \overline{PT2})\ PC1 + S1\ S2\ CLL\ PT8\ \overline{PT4}\ PT2\ \overline{PT1}\ PC1 \quad (10)$$

Logic STCL also provides various reports which identify significant changes of state. Four types of reports are provided:

1. a position report indicating that a key has been depressed;
2. a seizure report indicating that a calling party has seized the line;
3. an end of a digit report indicating the number of dial pulses comprising the digit; and
4. a disconnect report indicating the termination of a call.

The Boolean equations governing when a report is generated are indicated below wherein lead PT indicates a position report, lead SZ indicates a seizure report, lead EOD indicates an end of digit report and lead DSCN indicates a disconnect report.

$$PT = CLL\ PSR\ \phi 4\text{-}2 \quad (11)$$

$$SZ = \overline{PSR}\ \overline{S1}\ \overline{S2}\ CLL\ PT8\ \overline{PT4}\ PT2\ \overline{PT1}\ \phi 4\text{-}2 \quad (12)$$

$$EOD = \overline{PSR}\ S1\ S2\ CLL\ PT8\ \overline{PT4}\ PT2\ \overline{PT1}\ \phi 4\text{-}2, \text{ and} \quad (13)$$

$$DSCN = \overline{PSR}\ S1\ \overline{S2}\ \overline{CLL}\ PT8\ \overline{PT4}\ PT2\ \overline{PT1}\ \phi 4\text{-}2 \quad (14)$$

SPECIFIC

The operations of the system will now be described in detail in accordance with the example illustrated in FIG. 7. We will assume that the illustrated waveform corresponds to the trunk scan point state specified by lead 260A from trunk 260 in trunk group 26. Of course a similar waveform could be generated by each of the other tunk scan points associated with the local side of a trunk. Dial pulses are not detected by scan points, such as lead 260B, associated with the toll side of a trunk.

Because counter CNT in FIG. 2 increments its count every 9.64 $\mu$S, and because the counter recycles after 1280 counts, it is apparent that each scan point (such as the scan point associated with lead 260A of FIG. 1) is interrogated every 12.3 ms. The various timing indications in FIG. 7, TO-T61 represent the 12.3 ms intervals at which the scan point associated with lead 260A is interrogated. It should be understood that between each of the timing indications, such as between TO and Tl, each of the other scan points is interrogated. More specifically, the scanning of lead 260A actually requires only one cycle (9.64 $\mu$S) and comprises phases $\phi$-0 $\phi$9.

For this example shown in FIG. 7, we will assume that the stored information concerning scan point 260A is initially stored in the next to last stage of each of the shift registers. At $\phi$0 in the scan at time TO, decoding logic DL applies a HIGH signal to lead 2600 which enables NAND gate GO. This gate continues to generate a HIGH output signal because lead 260A is LOW reflecting the on-hook state of the communication path associated therewith. At $\phi$2, the information in each shift register is shifted one position to the right so that the information associated with lead 260A is shifted into the last stage of each shift register and applied to logic SIL and STCL after a 500 ns delay induced by elements DLY. These elements only prevent a race by serving to prevent the new bit shifted into each last stage from being used to generate the bits also inputted into the register at $\phi$2. At $\phi$3, gate 113 inserts a 0 into the first stage of register 114. Zeros are also inserted into each of the other stages as previously described. Output lead PL of OR gate 11 applies a LOW output to gate 311. During the time intervals $\phi$3-2, gate 311 applies a 0 to logic SIL. THUS, AT TO, PL=0, and LL=0 because the last time the scan point was interrogated before TO it was also on hook. Also PS=0 because the last time the scan point was scanned before TO, LL was equal to 0. Logic SIL applies a LOW output over lead CLL in accordance with the previously discussed equation below:

$$CLL = PL\ LL + LL\ PS + PL\ PS = \mathbf{00} + \mathbf{00} = \mathbf{00} = \mathbf{0.} \quad (15)$$

Also because the logic is in state A initially,

S1=0; S2 =0; PT8=1; PT4=0; PT2=1; PT1=0; and PC=don't care. Thus in accordance with the preceding equations (1)-(6) during the interval $\phi$4-2 logic STCL generates the following outputs:

S1N=0; S2N=0; PT8N=1; PT4N=0; PT2N=1; PT1N=0; PCN=don't care.

In accordance with the following equations (16) and (17) previously discussed, logic SIL generates the following outputs:

$$LLIN = PL\ \phi 4\text{-}2 \quad (16)$$

$$PSIN = LL\ \phi 4\text{-}2 \quad (17)$$

$$LLIN = \mathbf{0},\ PSIN = \mathbf{0}$$

All these outputs are inserted in the shift registers on the positive transition at $\phi$2 of the next cycle just prior to the interrogation of the next scan point.

To summarize the above when the communication path associated with lead 260A is on-hook, the logic assumes state A and recirculates all the information associated with lead 260A back into the first position of each of the shift registers. At the second cycle after TO, lead 260B associated with the toll side of trunk 260 is interrogated and in turn each of the other scan points is interrogated. Thus 12.3 ms (at time T1) after the first scan of scan point 260A (at a time TO), the information concerning scan point 260A has been shifted from the first stage of each shift register into the last stage of each shift register.

At time T1 the communication path associated with lead 260A goes on-hook. However, a seizure is not reported at this time; rather the seizure is only reported after verifying the change of state which requires two consecutive scans in which the change of state is detected.

More specifically at time T1, gate GO generates a LOW ouput which is inverted at $\phi$3 by gate 113. Thus PL is equal to 1. LLIN for the previous scan at TO now becomes LL for this scan; thus LL=0. Similarly LLIN at the last scan becomes PS for this scan and therefore PS=0. The same is true for each of the other variables inserted in shift registers CLL=0; S1=0; S2=0; PT8=1; PT4=0; PT2=1; PT1=0; and PC=don't care.

In accordance with the above-specified equations, logics STCL and SIL generate the following outputs:

S1N=0; S2N=0; PT8N=1; PT4N=0; PT2N=1; PT1N=0; PC=don't care; LLIN=1; PSIN=0.

Thus, with the exception of the last look bit (LLIN) each of the other bits is recirculated back into the first position of each of the shift registers at $\phi$2 of the next cycle.

Now at T2, PL=1; LL=1; PS=0. Thus LLIN=1 and PSIN=1. In accordance with equation (15), CLL=1 which indicates a verified change of state. The bottom line of FIG. 7 indicates that at time T2, the logic goes from state A which represents an idle line to state B which represents a seizure. Thus with reference to FIG. 5, it is seen that when the logic is in state A and CLL=1 and PT=1010, then the logic assumes state B which represents a seizure.

Logic STCL at time T2 is provided with the following inputs S1=0; S2=0; PT8=1; PT4=0; PT2=1; PT1=0; PC=don't care. Thus, SIN=0; S2N=0 and the pulse timing is set to 0. Thus, PT8N=0; PT4N=0; PT1N=0; PT1N=0; and Pc=don't care. Since a seizure is indicated, SZ=1 in accordance with equation 12 wherein $\overline{PSR}$=1 because a position is not being scanned. The output of lead SZ from logic STCL goes HIGH enabling gate 315. At $\phi$5 this gate inserts a 1 into the second bit position of register OR. This is designated an S bit which indicates a seizure. Also at $\phi$5, the thirteen outputs of counter CTN which identify scan point 260A as a binary count are gated over cable 412 to gate 413 where the 13-bit count is inserted in register OR. Gate 413 symbolically represents 13 separate gates, each gate for gating in the signal from a stage of counter CNT into register OR at $\phi$5. OR gate 316 responsive to the HIGH level of lead SZ provides a HIGH output over lead 317 to enable symbolic gate 318. At $\phi$6, gate 318 gates out the word stored in register OR to a central processor. For the report of a seizure such as here all other bits in the word are irrelevant except the 13-bit address and the S bit. At $\phi$7 register OR is cleared so that it can accept another report for a subsequent scan point.

At time T3 in FIG 8 the line associated with scan point 260A is still off-hook. Thus PL=1; LL=1; PS=1. Therefore, logic SIL generates the following outputs: CLL=1; LLIN=1; PSIN=1. Also, logic STCL receives the following inputs:

SL=0; S2=0; PT8=0; PT4=0;

PT2=0; PT1=0; PC=don't care. Since PT=0000 and CCL=1, the logic assumes state C which represents a stable call and merely recirculates all state, timing, and pulse count information. Thus SIN=0; S2N=0; PT8N=0; PT4N=0; PT2N=0; PT1N=0; and PC=don't care.

At time T4 in FIG. 8 an on-hook state is detected. However, this on-hook state must be verified on a subsequent scan to determine whether the on-hook represents a dial pulse or the beginning of a disconnect. The on-hook state is verified at time T5, and pulse timing is not begun. As hereinafter described, if the line remains on-hook for 10 counts (scans), which is equivalent to 123 ms. then a disconnect is indicated on the subsequent scan. However, if the line goes off-hook again prior to 10 scans, then a dial pulse is indicated. The pulse counting shift registers are then utilized to count the number of received dial pulses.

More specifically, at T4, PL=0; LL=1; PS=1. Thus, the following outputs are generated by logic SIL: CLL=1; LLIN=0; PSN=1. The state, pulse time, and pulse count outputs generated by logic STCL are identical to those described previously in regard to T3.

At time T5, the logic assumes state D (which indicates the start of a pulse or disconnect) because the on-hook state is verified at this scan. Thus, PL=0; LL=0; PS=1. Logic SIL generates the following outputs CLL=0; LLIN=0; PSIN=0. Lead CLL went from a HIGH to a LOW state thereby indicating a verified change of state. The following inputs are applied to logic STCL--S1=0; S2=0; PT8=0; PT4=0; PT2=0; PT1=0 and PC=don't care. Logic STCL then generates the following outputs SIN=1; S2N=0; PT8N=0; PT4N=0; PT2N=0; PT1N=0; PC8N=0; PC4N=0; Pc2N=0; and PC1N=0.

At T6, the logic goes from state D to state F indicating that the pulse or disconnect is continuing. In state F, pulse timing is begun, and PT is incremented by 1. More specifically, PL=0; LL=0; PS=0. Therefore, logic SIL provides the following outputs: CLL=0; LLIN=0; PSIN=0. Logic STCL is provided with the following inputs: S1=1; S2=0; PT8=0; PT4=0; PT2=0; PT1=0; PC8=0; PC4=0; PC2=0; and PC1=0. It should be noted that the pulse count was set equal to 0 at T5 so that the pulse count can be subsequently incremented to count the number of dial pulses received. Logic STCL provides the following outputs during the time interval $\phi$4-2; SIN=1; S2N=0; PT8N=0; PT4N=0; PT2N=0; PT1N=1; PC8N=0; PC4N=0; PC2N=0; PC1N=0. As mentioned previously, these outputs are gated into the respective shift registers at $\phi$2 of the next cycle.

At T7, the logic remains in state F and the pulse time is again incremented by 1. Thus at T7 all the logical variables assume the same state as at T6 with the exception of the pulse time (PT) which goes from 0001 to 0010.

At T8, an off-hook line is detected and the present look is equal to 1. However, the logic remains in state F until the off-hook state can be verified at the next scan. Also, at T8 the pulse time is again incremented. Thus the input variables for T8 are in the same state as those for T7 with the exception that PL=1 and PT=0011. Accordingly, the output variables are also the same except PTN is equal to 0011, and LLIN=1.

At T9, the off-hook state is verified and the logic goes from state F to state E to indicate the end of a dial pulse. A dial pulse is indicated rather than a disconnect because the pulse time did not assume the count of 10 (i.e., 1010 in binary) which is equivalent to 123 ms. Thus at T9, PL=1; LL=1; PS=0. Logic SIL provides the following outputs CLL=1; LLIN=1; PSIN=1. Logic STCL is provided with the following inputs using the simplified notation previously described: S1=1; S2=0; PT=0011; PC=0000. Logic STCL resets the pulse time to 0 and also increments the pulse count by 1 to indicate that a new dial pulse has been detected. More specifically logic STCL provides the following outputs: SIN=1; S2N=1; PT8N=0; PT4N=0; PT2N=0; PT1N=0; and PC8N=0; PC4N=0; PC2N=0; PC1N=1.

At T10 the logic goes from state E to state I, which represents interdigit timing. In state I, the pulse time is again incremented for use in determining whether a new dial pulse in the same digit is to be received or whether the previous dial pulse represents the end of the digit. For example this timing is instituted to ascertain whether the calling party has dialed a 1 or a digit greater than 1.

At T10: PL=1; LL=1; PS=1. Logic SIL provides the following outputs: CLL=1; LLIN=1; PSIN=1. Logic STCL is provided with the following inputs: S1=1; S2=1; PT=0000; PC=0001. Logic STCL then provides the following outputs during the time period $\phi$4-2; S1N=1; S2N=1; PT8N=0; PT4N=0; PT2N=0; PT1N=1; PC8N=0; PC4N=0; PC2N=0; PC1N=1.

The logic remains in state I during T11 and T12. The logic variables during T11 and T12 are essentially the same as is described in regard to T10 with the exception that the pulse time is incremented at each of these times. Therefore, at T11, PTn=0010 and T12, PTN=0011.

At T13, the on-hook state of the line is detected. However, the logic remains in state I since this on-hook state has not yet been verified. The logical variables associated with T13 are essentially the same as those previously described for T10 with the exception that PL=0; LLIN=0; and PTN=0100.

At T14 the logic goes from state I to state H to indicate that a new dial pulse in the same digit has been detected. In state H, the pulse time is again set to 0 for use in subsequently ascertaining whether the on-hook state represents a dial pulse or a disconnect. More specifically at T14 PL=0; LL=0; PS=1. Logic SIL provides the following outputs: CLL=0; LLIN=0; PSIN=0. Logic STCL is provided with the following inputs S1=1; S2=1; PT=0100; PC=0001. Logic STCL provides the following outputs: SIN=1; S2N=0; PT8N=0; PT4N=0; PT2N=0; PT1N=0; PC8N=0; PC4N=0; PC2N=0; PC1N=1.

At T15, the logic goes from state H to state F and remains in state F till T18. The logical varables associated with state F are the same as those previously described in regard to times T6-T9.

At T18, the logic goes from state F to state E to indicate the end of the dial pulse. State E was previously described in regard to T9. However at T18, the pulse count is again incremented so now PCN=0010 indicating two dial pulses have been received; and also the pulse time is initialized so again PTN=0000.

At T19 the logic assumes state I and begins interdigit timing to ascertain whether or not another dial pulse is to follow. At each of the times T19-T28, the pulse time is incremented by 1. Finally at T29, the pulse time (PT) is equal to 1010 which represents a timing interval of 123 ms. This indicates that the last dial pulse for this digit has been received.

Thus at T29 the logic assumes state J which represents an end of a digit. A report is now made to indicate that the end of a digit has been detected and to indicate the pulse count associated therewith which represents the number of received dial pulses. Thus at T29: PL=1, LL=1; PS=1. Logic SIL provides the following outputs: LLIN=1; PSIN=1; CLL=1. Logic STCL is provided with the following inputs: S1=1; S2=1; PT=1010; PC=0010. Logic STCL provides the following outputs: S1N=0; S2N=0; PT8N=0; PT4N=0; PT2N=0; PT1N=0; PC8N=0; PC4N=0; PC2N=1; PC1N=0. Logic STCL also provides a HIGH output signal on lead EOD in accordance with equation 13.

Thus at $\phi$5 in the cycle beinning at T29, gate 320 is energized to insert a 1 in the third stage of register OR. Lead EOD also provides a HIGH output to gate 321 to gate into register OR THE 4-bit pulse count at time $\phi$5. Gate 321 is symbolic of the 4 gates utilized to gate in PC8N; PC4N; PC2N; and PC1N. Also, at $\phi$5, gate 431 gates in the address of lead 260A over cable 412 as previously described in regard to the seizure report. Thus register OR contains a report of the end of digit including the number of dial pulses in the digit and the address of the scan point associated with this report. At $\phi$6 gate 318 is energized as previously described and provides the word in register OR to the main processing unit.

At T30 the logic assumes state C which represents a stable call. For a typical call further dial pulses in a series of digits will be received and processed by the scanner in an identical manner to that previously described. However, to simplify this discussion, it will be assumed all these dial pulses have been received and that the call is completed to its destination and the parties are able to converse over the completed path. The logical variables associated with time intervals T28-T50 are substantially identical to those previously described in regard to T3 and T4. At T51, the logic assumes state D in the manner substantially identical to that described in regard to T5. During time interval T52-T61, the logic remains in state F and times the pulse or disconnect. This is substantially identical to the previous description in regard to T6 and T7 with the exception that the pulse timing reaches 1010 indicating that the on-hook signal is a disconnect rather than a dial pulse. Thus at T62 the logic assumes state G which represents a disconnect. More specifically at T62, PL=0; LL=0; PS=0. Logic SIL provides the following outputs: CLL=0; LLIN=0. Logic STLL is provided with the following inputs S1=1; S2=0; PT=1010; PC=0000. Logic STCL then provides the following outputs S1N=0; S2N=0; PTN=1010; PC=0000. Logic stcL also provides a HIGH output signal over lead DSCN to report the disconnect. At $\phi$5 gate 322 provides a HIGH output signal which inserts a 1 in the first bit position of register OR. Also as previously described gate 413 is utilized to insert the 13-bit address of scan point 260A in register OR. Gate 318 provides the disconnect repport to the main processor at $\phi$6 in response to the HIGH output of gate 316.

At T63, the logic assumes state A which represents an idle line and the logic again begins to detect the institution of a new call and processes this call in the same manner as previously described.

Thus, a plurality of shift registers are utilized to store state, timing, and status information for the scan points in the same order in which the scan points are interrogated. The information for a particular scan point is always gated out of the last stage of each of the registers and after such information is updated it is inserted in the first stage of each of the registers. As subsequent scan points are interrogated the information is shifted stage-by-stage toward the last stage of each shift register until 12.3 ms after the last interrogation of a particular scan point, this particular scan point is again interrogated and the information for this scan point is shifted out of the last stage of each register.

This scanner is adapted to perform pulse timing and pulse counting operations to minimize the processing burden of the main processor. Accordingly, the scanner only reports significant changes of states such as seizures, disconnects, and end of digits. As hereinafter described, the scanner is also adapted to detect service requests from a plurality of operator positions PS0-PS25.

POSITION SCANNING

In addition to scanning trunks as previously described the scanner is also adapted to scan positions PS0-PS25. Positions are scanned in the same manner in which the trunks were scanned with the exception that the information in the state, pulse time, and pulse count registers is no longer relevant. Instead logic SIL ascertains whether a position has a service request based upon (1) the information in last look register RLL (2) the information in state-before-last-look register RPS, and (3) present look information.

As mentioned previously each of the positions is interrogated every 12.3 ms just like the trunk scan points. More specifically, decoding logic DL in FIG. 2 sequentially provides output signals over leads P0-P25 to sequentially enable gates PZ0-PZ25 respectively. Each of these gates such as PZ0 symbolically represents 9 gates to gate 9 bits from each of the positions. If a position has a service request caused by the depression of a key on the operator's position, three of the nine output leads from the position will be 1s (HIGH) and the remaining leads 0s (LOW). The specific coding of 0 and 1 leads specify the type of service requested. To elaborate we will assume that decoding logic DL responsive to a specific count in counter CNT provides a HIGH output signal over lead PO, which signal serves to energize gate PZ0. We will further assume that position PZ0 does have a service request and therefore three of its output leads are HIGH. Gate PZ0 gates the signals on these output leads to 3-out-of-9 check logic CLG. Logic CLG comprises combinatorial logic which verifies whether or not 3-out-of-9 leads are enabled and further verifies that the coding is a valid service request. If the service request is valid, CLG provides a HIGH signal on lead PSR. Lead PSR extends to state timing and control logic STCL and is utilized to inhibit the generation of reports concerning disconnects, seizures, and end of digits since such reports are not appropriate for positions. Logic CLG also provides the HIGH signal on lead PSR to OR gate 11 which generates a HIGH present look signal which signal is gated to logic SIL in FIG. 3 by gate 311 during the time interval $\phi$3-2. Last look and previous state information are stored for position PS0 in the same manner in which they were stored for each of the trunk scan points.

Thus for the first scan in which a service request is detected, PL=1; LL=0; and PS=0. Accordingly, logic SIL would then generate the following output signals; LLIN=1; PSIN=0; and CLL=0. A report of a service request from a position would not be made at this time. However, if on the next scan of position PSO, lead PL was still equal to 1, and since LL=1, logic SIL would generate a HIGH output on lead CLL. Logic STCL would then apply a HIGH output to lead PT in accordance with equation (18) below:

$$PT = CLL\ PSR\ \overline{PS} \qquad (18)$$

The HIGH level of lead PT energizes gate 323 at $\phi$5 so that a 1 is inserted in the 4th bit position of register OR. Lead PT also energizes gate 324 at $\phi$5 so that the 3-out-of-9 code is gated into register OR over cable 325 which is connected to the nine output leads associated with gate PZ0 in FIG. 1. Also as previously described at $\phi$5, gate 413 gates in the 13 bit address or count which identifies position PS0.

Thus, my scanner is beneficially adapted to scan positions and trunks in an essentially identical manner. Accordingly as future growth requires, positions may be substituted for trunks or vice versa without entailing the need to substantially alter the scanner.

SUMMARY

My scanner beneficially utilizes a sequentially accessible memory to store pulse timing, pulse count, and state information for a plurality of scan points. The scan points are interrogated to derive present look information in the same sequence in which the stored information is retrieved from memory. Thus, each scan point whether it monitors a trunk, position, or any other entity can be handled on a time division basis in which the required stored information can be easily updated and returned to memory. Moreover, by placing the functional line status determination logic in the scanner, the work load of the main processor can be reduced. My scanner is beneficially adapted to report only major changes of state which require immediate action by the main processor.

Although this illustrative embodiment of my scanner has been described in terms of a telephone communication system, it is obvious that my scanner can be utilized in any environment in which a plurality of scan points are scanned to detect changes of state and functional line statuses including the detection of call signals.

What is claimed is:

1. In a traffic service position system having a plurality of trunks and a plurality of operator positions, a first plurality of scan points respectively associated with said plurality of operators' positions and each indicating service request information for the position associated therewith;

a second plurality of scan points respectively associated with said plurality of trunks over which calls are instituted by the conveyance thereover of digits in the form of groups of pulses, each of said second plurality of scan points indicating the on- or off-hook state of the trunk associated therewith;

a sequentially accessible memory storing a first plurality of words respectively associated with said plurality of positions and storing a second plurality of words respectively associated with said plurality of trunks, said memory comprising a first group of shift registers storing prior state information specifying the state of each of said positions and trunks at each of two previous interrogations thereof, a second group of shift registers storing timing information associated with pulse, interdigit, and disconnect timing, a third group of shift registers storing pulse count information specifying the number of pulses in each group of pulses received over said trunks, a fourth group of shift registers storing information specifying whether each call is in a pulse-disconnect timing mode or an interdigit timing mode, said words stored in said memory including information in each of said groups of shift registers;

means for controlling said four groups of shift registers to output said words in sequential order;

means for interrogating each said scan point concurrent with the outputting of the word associated therewith from said memory; and logic means jointly responsive to the state of an interrogated scan point and to said output word associated with said interrogated scan point for generating reports indicating either 1. seizure of the trunk associated with said interrogated scan point,
2. the end of a digit received over the trunk associated with said interrogated scan point and the number of pulses therein,
3. release of the trunk associated with said interrogated scan point, or
4. a service request from an operator's position associated with said interrogated scan point.

* * * * *